April 7, 1925. 1,532,907
W. LONG
FLUID PRESSURE REGULATOR
Filed March 2, 1923
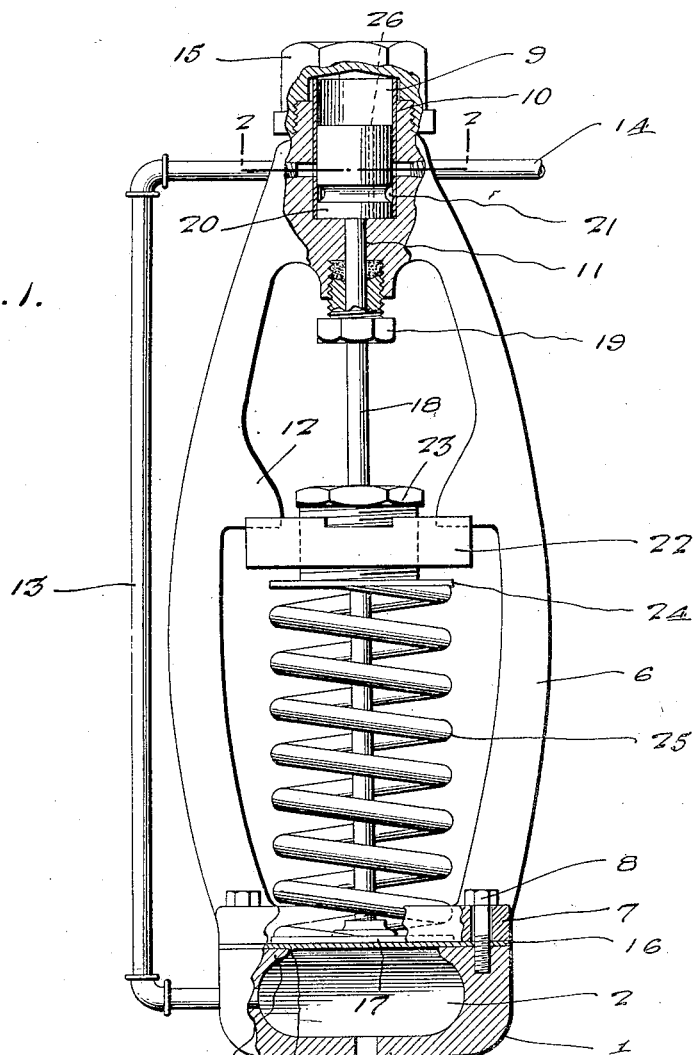
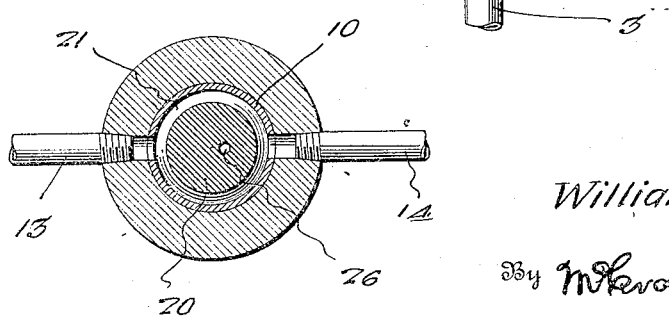
Inventor
William Long
By McCracken & Patch
his Attorneys Patented Apr. 7, 1925.

1,532,907

UNITED STATES PATENT OFFICE.

WILLIAM LONG, OF PARMA, IDAHO, ASSIGNOR OF ONE-HALF TO EVAN G. JOHNSON, OF PARMA, IDAHO.

FLUID-PRESSURE REGULATOR.

Application filed March 2, 1923. Serial No. 622,324.

*To all whom it may concern:*

Be it known that I, WILLIAM LONG, a citizen of the United States, residing at Parma, in the county of Canyon and State of Idaho, have invented certain new and useful Improvements in Fluid-Pressure Regulators, of which the following is a specification.

My present invention relates to fluid-pressure regulators, and particularly to a relief valve type of regulator adapted for use in connection with pressure lines or tanks, and in other like connections, to guard against the pressure rising above any given point.

An object is to provide a device of this character which can be connected in any pipe or hose line, or with any receptacle where fluid is confined under pressure, and which will automatically act to relieve the fluid pressure, should this rise above a predetermined point.

A further object is to so construct the parts that the regulator can be set to become effective at different pressures.

Yet another object is to provide a valve structure, forming the fluid controlling portion of the mechanism, which is of such character that the regulator can be used in pipe lines carrying muddy water or other fluids or liquids which would score and injure a poppet or ball valve, without being injured or scored so that it will leak.

With the above and other objects in view, which will be apparent to those skilled in the art, my invention includes certain novel features of construction and combinations of parts which will now be set forth in connection with the drawings.

In the drawing:

Figure 1 is a view in elevation of a regulator constructed in accordance with my invention and with parts in broken section, to better illustrate the operating and valve mechanisms.

Fig. 2 is a transverse sectional view on the line 2—2 of Fig. 1 with the valve piston raised to the open position.

The base 1 is provided with a fluid chamber 2, and a pipe 3 which leads from the fluid carrying line, tank, or the like, is connected in communication with this chamber. The top of the casing or base 1 is provided with a circular opening as at 4, and the flange 5 overhangs around this opening.

A yoke 6 is carried on a ring 7 adapted to be mounted on the base 1 around the opening 4 and secured thereon by means of cap bolts 8. At its upper end this yoke 6 has a piston chamber 9, which is preferably provided with a cylindrical lining 10. An opening or bore 11 is provided through the head portion of the yoke axially in line with the piston chamber and the circular opening 4, and supporting lugs 12 are provided about midway on the inner sides of the arms of the yoke.

A fluid pipe 13 is connected with the chamber 2 and has its remaining end extending through the head of the yoke to open radially through the cylinder lining 10, and a discharge pipe 14 is connected with the yoke head and through the cylinder lining 10 at a point substantially diametrically opposite the opening from pipe 13. The top end of the piston chamber 9 is closed by means of a cap 15 screwed onto or otherwise held in place upon the yoke head.

A diaphragm 16, which is of disc form and of rubber or other suitable material, is secured and clamped between the base 1 and ring 7, and thus closes the top of fluid chamber 2. As the upper side of the diaphragm is unconfined, this diaphragm is distended and raised when the pressure becomes sufficiently great within chamber 2 to overcome the natural resiliency of the material of the diaphragm.

A circular disk or head 17 is located on the upper side of the diaphragm 16 to rest at its edges on flange 5, and a stem 18 connected with this head extends slidably through opening 11 into piston chamber 9, a suitable packing gland 19 being provided to prevent the escape of fluid around stem 18 from the piston chamber. A piston valve 20, having a semi-circular groove 21 cut or otherwise formed peripherally therein is connected with the upper end of stem 18 to slide within the cylinder 10, the groove 21 being located at such a position upon the length of the piston valve that when the valve is in its lowermost position, the groove is below the openings of pipes 13 and 14, and that when the valve is raised to its uppermost position, the groove will be in full registry with the openings of these pipes.

A ring 22 is fitted around stem 18 to bear against lugs 12, and an adjusting nut 23 is loosely fitted around stem 18 to turn and feed within a threaded orifice in the ring 22. This adjusting nut 23 in turn bears against a washer 24, and a helical spring 25 is confined between washer 24 and disk or head 17, around the lower portion of stem 18. This spring 25 resiliently urges the disk or head 17 down to a position of rest against flange 5, in which position the valve piston 20 is disposed with its solid wall presented over the openings of pipes 13 and 14, and as the pressure within chamber 2 becomes sufficiently high to distend diaphragm 16 and raise head 17 against the pressure of spring 25, piston valve 20 is slid up to bring groove 21 into complete or partial registry with the openings of pipes 13 and 14. This registry of the groove permits the flow of fluid through pipe 3, chamber 2, pipe 13, groove 21, and discharge pipe 14, back to the source of supply, or back to any suitable discharge. This escape of the fluid will bring down the pressure in the line or tank, and will automatically regulate to the desired pressure. Adjusting nut 23 is turned to vary the compression of spring 25 and consequently vary the setting of head 17 against diaphragm 16, to give adjustment for different fluid pressures. To permit free movement of piston valve 20 within piston chamber 9, and to guard against back pressure upon this valve, a bore or opening 26 is provided longitudinally through the piston valve, slightly off center to clear stem 18.

In the use of my improved regulator, piston valve 20 is normally held in the position shown in the drawings, where the outlet end of pipe 13 opens against the solid wall of this valve, and as the fluid is at rest within pipe 13, there is no possibility of the valve or cylinder 10 becoming scored or being otherwise injured. When fluid is flowing from pipe 13 to pipe 14, groove 21 is in registry with the openings of these pipes, and dirt and grit cannot cut the piston or cylinder.

From the foregoing it will be seen that I have provided a fluid pressure regulator of simple construction, which can be installed and used in any desired connection, and which is of such construction that there is no possibility of the valve portions being scored or otherwise injured in use. While I have shown and described only one specific construction and one particular adaptation and connection of the parts, it will be appreciated that changes and variations can be made to suit different conditions of operation and use, without departing from the spirit and scope of my invention.

I claim:

1. A fluid pressure regulator comprising, with a base having a fluid chamber therein open at one side, a yoke secured on the open side of the base and provided with a piston valve cylinder, a diaphragm secured over the opening of the fluid chamber, a pipe leading to said fluid chamber from the fluid container to be regulated, a pipe leading from the fluid chamber and opening laterally into the valve cylinder, a discharge pipe leading from the valve cylinder at a point substantially diametrically opposite said first opening, a head bearing on the diaphragm, a stem connected with said head with its remaining end slidably received within the valve cylinder, a piston valve carried by said stem within the valve chamber and provided with a peripheral groove, a ring fitted around said stem and held in fixed position by the yoke, an adjusting nut carried by said ring around the stem, and a spring bearing between the adjusting nut and the head connected with said stem.

2. A fluid pressure regulator comprising, with a base having a fluid chamber therein open at one side, a yoke secured over the open side of the base and provided with a piston valve cylinder alined axially with the opening, a diaphragm secured over the opening, a pipe leading to said fluid chamber from the fluid container to be regulated, a pipe leading from the fluid chamber and opening laterally into the valve cylinder, a discharge pipe connected to discharge from the valve cylinder at a point substantially diametrically opposite the first opening, a head bearing on the diaphragm, a stem connected with said head and having its remaining end slidably received within the cylinder, a piston valve mounted on said stem within the valve chamber and provided with a peripheral groove located to be out of registry with the openings through the sides of the cylinder when the valve is in its lowermost position, an adjusting nut loosely received around the stem and held in place by the yoke, a spring fitted around said stem and bearing between said adjusting nut and the head to resiliently hold the piston valve normally in a position with the groove out of registry with the lateral openings of the cylinder, and a fluid passage formed longitudinally through the piston valve.

In testimony whereof I affix my signature.

WILLIAM LONG.